US011061135B2

(12) United States Patent
Abbott et al.

(10) Patent No.: US 11,061,135 B2
(45) Date of Patent: Jul. 13, 2021

(54) SYSTEMS AND METHODS FOR DETECTING BURIED NON-CONDUCTIVE PIPES

(71) Applicants: Ben Allen Abbott, San Antonio, TX (US); Donald R. Poole, San Antonio, TX (US)

(72) Inventors: Ben Allen Abbott, San Antonio, TX (US); Donald R. Poole, San Antonio, TX (US)

(73) Assignee: Heath Consultants Incorporated, Houston, TX (US)

( * ) Notice: Subject to any disclaimer, the term of this patent is extended or adjusted under 35 U.S.C. 154(b) by 174 days.

(21) Appl. No.: 16/185,678

(22) Filed: Nov. 9, 2018

(65) Prior Publication Data

US 2019/0146080 A1     May 16, 2019

Related U.S. Application Data

(60) Provisional application No. 62/584,472, filed on Nov. 10, 2017.

(51) Int. Cl.
*G01S 13/88* (2006.01)
*G01S 13/08* (2006.01)
(Continued)

(52) U.S. Cl.
CPC .......... *G01S 13/885* (2013.01); *G01S 13/003* (2013.01); *G01S 13/08* (2013.01); *G01V 3/12* (2013.01); *G01V 3/17* (2013.01)

(58) Field of Classification Search
CPC combination set(s) only.
See application file for complete search history.

(56) References Cited

U.S. PATENT DOCUMENTS

| 5,655,561 A | 8/1997 | Wendel et al. |
| 6,003,376 A | 12/1999 | Burns et al. |

(Continued)

FOREIGN PATENT DOCUMENTS

WO       99053616 A1     10/1999

OTHER PUBLICATIONS

Bimpas, Matthaios et al.; "Detection of water leaks in supply pipes using continuous wave sensor operating at 2.45 Ghz"; Journal of Applied Geophysics; 70 (2010) pp. 226-236.

(Continued)

*Primary Examiner* — Mamadou L Diallo
(74) *Attorney, Agent, or Firm* — Bracewell LLP; Douglas W. Rommelmann (57) ABSTRACT

A method for detecting a buried non-conductive pipe includes transmitting, by a radio frequency (RF) transmitter, guided RF energy through one end of the non-conductive pipe, receiving, by a RF receiver, electromagnetic signals due to RF energy leaks in one or more locations along the non-conductive pipe, and processing, by one or more processors, the received signals to determine a location of the non-conductive pipe. A system for detecting a buried non-conductive pipe includes a RF transmitter configured to transmit guided RF energy through one end of the non-conductive pipe, a RF receiver configured to receive electromagnetic signals due to RF energy leaks in one or more locations along the non-conductive pipe, and one or more processors configured to process the received signals to determine a location of the non-conductive pipe.

14 Claims, 5 Drawing Sheets

(51) Int. Cl.
  *G01S 13/00*   (2006.01)
  *G01V 3/12*    (2006.01)
  *G01V 3/17*    (2006.01)

(56) References Cited

U.S. PATENT DOCUMENTS

| | | | |
|---|---|---|---|
| 6,005,396 A * | 12/1999 | Suyama | G01N 22/02 |
| | | | 324/528 |
| 6,515,480 B1 | 2/2003 | Belew et al. | |
| 6,667,709 B1 * | 12/2003 | Hansen | G01S 13/86 |
| | | | 324/326 |
| 6,734,674 B1 * | 5/2004 | Struse | G01M 3/18 |
| | | | 324/326 |
| 7,336,078 B1 | 2/2008 | Merewether et al. | |
| 7,526,944 B2 | 5/2009 | Sabata et al. | |
| 8,264,226 B1 | 9/2012 | Olsson et al. | |
| 8,365,581 B2 | 2/2013 | Buhring | |
| 9,593,999 B2 | 3/2017 | Fleury, Jr. et al. | |
| 2013/0003501 A1 * | 1/2013 | Marquez | G01M 3/40 |
| | | | 367/83 |
| 2014/0130577 A1 * | 5/2014 | Chatzigeorgiou | G01M 3/2815 |
| | | | 73/49.1 |
| 2014/0218225 A1 * | 8/2014 | Simicevic | G01S 13/885 |
| | | | 342/22 |
| 2019/0137454 A1 * | 5/2019 | Bates | G01V 1/005 |

OTHER PUBLICATIONS

Goh, J.H. et al.; "Water Pipe Leak Detection Using Electromagnetic Wave Sensor for the Water Industry"; 2011 IEEE Symposium on Computers & Informatics; pp. 290-295.
European Supplemental Search Report dated Apr. 4, 2019.

* cited by examiner

SYSTEMS AND METHODS FOR DETECTING BURIED NON-CONDUCTIVE PIPES

CROSS REFERENCE TO RELATED APPLICATIONS

This application claims priority to and the benefit of, and incorporates herein by reference in its entirety, U.S. Provisional Patent Application No. 62/584,472, which was filed on Nov. 10, 2017.

BACKGROUND OF THE INVENTION

1. Technical Field

The present invention relates generally to detecting objects using radio technology. More specifically, the present invention relates to systems and methods for detecting buried non-conductive pipes using radio detection and ranging (radar) technology.

2. Description of Related Art

There are many situations where is it desirable to locate buried utilities such as pipes and cables. For example, prior to starting any new construction that involves excavation, it is important to locate existing underground utilities such as underground power lines, gas lines, phone lines, fiber optic cable conduits, CATV cables, sprinkler control wiring, water pipes, sewer pipes, etc., collectively and individually referred to hereinafter as "utilities" or "objects." As used herein the term "buried" refers not only to objects below the surface of the ground, but in addition, to objects located inside walls, between floors in multi-story buildings or cast into concrete slabs, etc. If a back hoe or other excavation equipment hits a high voltage line or a gas line, serious injury and property damage can result. Severing water mains and sewer lines leads to messy cleanups. The destruction of power and data cables can seriously disrupt the comfort and convenience of residents and cost businesses huge financial losses.

Buried objects can be located by sensing an electromagnetic signal emitted by the same. Some cables such as power lines are already energized and emit their own long cylindrical electromagnetic field. Location of other conductive lines necessitates their energizing with an outside electrical source having a frequency typically in a range of approximately 50 Hz to 500 kHz. Location of buried long conductors is often referred to as "line tracing."

A sonde (also called a transmitter, beacon or duct probe) typically includes a coil of wire wrapped around a ferromagnetic core. The coil is energized with a standard electrical source at a desired frequency, typically in a range of approximately 50 Hz to 500 kHz. The sonde can be attached to a push cable or line or it may be self-contained so that it can be flushed. A sonde generates a more complex electromagnetic field than that produced by an energized line. However, a sonde can be localized to a single point. A typical low frequency sonde does not strongly couple to other objects and thereby produce complex interfering fields that can occur during the tracing. The term "buried objects" as used herein also includes sondes and buried locatable markers such as marker balls.

Besides locating buried objects before excavation, it is further desirable to determine the depth of the objects. This is generally done by measuring the difference in field strength at two locations. Although various methods of determining depth of buried conductors are well-established, it is also well known that prior methods can produce variable results and potentially dangerous errors in depth estimation when in the presence of complex or distorted fields. Portable locators that heretofore have been developed offer limited functionality insufficient for quickly and accurately locating buried utilities.

Busy metropolitan areas offer numerous opportunities for encroachment and possible damage to buried gas service lines. Oftentimes, the buried gas service lines are polyethylene (PE) pipes or other non-conductive pipes. In such instances, conductive tracer wire is typically laid down along the pipeline during the installation phase of the pipeline to assist with locating the buried pipeline at a later time. While the installed tracer wire makes it relatively easy to locate the PE or other non-conductive pipe for a period of time after their installation, over time the tracer wire often corrodes away providing significant pipeline location challenges, as for example by a gas service crew.

Another concern is locating buried gas service lines among numerous other structures, such as underground electrical conduits and water lines. Line location concerns are also presented when the lines are buried beneath sidewalks or paved city streets. The logistics of mobilizing crews to search for the lines, hand dig to locate them for construction crews, and perhaps excavate areas for confirmation of the service line location can be significantly expensive. The ability to locate a service line within eighteen inches (18") laterally on the surface with the line being buried at a depth of three to four feet offers significant opportunities for labor and contract services, and encroachment call-outs that could easily amount to $3,000 per day per event. For a gas company operating in a large city, there could be in excess of 2,000 encroachments in a year.

Several technologies have been developed in order to address this issue, including acoustic, RFID, and ground-penetrating radar (GPR). The current technologies available on the market today suffer from a variety of limitations that restrict their effectiveness. Technologies like GPR are generally expensive, difficult to operate and offer only limited capabilities in mapping underground pipelines.

SUMMARY OF THE INVENTION

Accordingly, there is a need for advanced systems and mechanisms that can be easily implemented at a lower cost and provide high accuracy in locating non-conductive pipes that may be buried several feet underground.

One example embodiment is a method for detecting a buried non-conductive pipe. The method includes transmitting, by a radio frequency (RF) transmitter, guided RF energy through one end of the non-conductive pipe, receiving, by a RF receiver, electromagnetic signals due to RF energy leaks in one or more locations along the non-conductive pipe, and processing, by one or more processors, the received signals to determine a location of the non-conductive pipe. The method may also include determining, by the one or more processors, a distance travelled by the RF energy by determining a difference in time from when the energy is detected by the RF receiver versus when the energy was transmitted from the RF transmitter. The method may further include detecting, by the receiver, a direction of the leaked RF energy, and creating a set of crossing vectors to precisely locate the leak on the non-conductive pipe. The method may also include filtering, by the one or more processors, the received signals using a band-pass filter, and generating, by the one or more processors, a spectrogram of the band-pass filtered signals. The method may further include modulating, by the transmitter, the RF signal to transmit 1000 Hz signals at a frequency of approximately 40 MHz or more. The processing step may further include processing the received signals using interferometry to detect phase changes.

Another example embodiment is a system for detecting a buried non-conductive pipe. The system may include a radio frequency (RF) transmitter configured to transmit guided RF energy through one end of the non-conductive pipe, a RF receiver configured to receive electromagnetic signals due to RF energy leaks in one or more locations along the non-conductive pipe, and one or more processors configured to process the received signals to determine a location of the non-conductive pipe. A carrier frequency of the RF transmitter can be approximately 40 MHz or more, and the RF receiver may include an AM receiver and a directional antenna. The one or more processors may be further configured to determine a distance travelled by the RF energy by determining a difference in time from when the energy is detected by the RF receiver versus when the energy was transmitted from the RF transmitter. The receiver may be further configured to detect a direction of the leaked RF energy, and the one or more processors are configured to create a set of crossing vectors to precisely locate the leak on the non-conductive pipe. The one or more processors may be further configured to filter the received signals using a band-pass filter; and generate a spectrogram of the band-pass filtered signals. The system may also include a modulator configured to modulate the RF signal to transmit 1000 Hz signals at a frequency of approximately 40 MHz or more. The one or more processors may be further configured to process the received signals using interferometry to detect phase changes.

Another example embodiment is a method for detecting a buried non-conductive pipe. The method includes transmitting, by a radio transmitter, guided radio frequency (RF) energy at a predetermined location on the ground, receiving, by a RF receiver, electromagnetic signals due to reflection of radio signals at one or more locations along the non-conductive pipe, and processing, by one or more processors, the received signals to determine a location of the non-conductive pipe. The method may also include determining, by the one or more processors, a distance travelled by the RF energy by determining a difference in time from when the energy is detected by the RF receiver versus when the energy was transmitted from the RF transmitter. The method may further include detecting, by the receiver, a direction of the reflected RF energy, and creating a set of crossing vectors to precisely locate the location of the non-conductive pipe. The method may also include filtering, by the one or more processors, the received signals using a band-pass filter, and generating, by the one or more processors, a spectrogram of the band-pass filtered signals. The method may further include modulating, by the transmitter, the RF energy to transmit 1000 Hz signals at a frequency of approximately 40 MHz or more. The processing step may further include processing the received signals using interferometry to detect phase changes.

BRIEF DESCRIPTION OF THE DRAWINGS

The foregoing aspects, features, and advantages of embodiments of the present disclosure will further be appreciated when considered with reference to the following description of embodiments and accompanying drawings. In describing embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Like reference numerals refer to like elements throughout the specification.

DETAILED DESCRIPTION OF THE PREFERRED EMBODIMENTS

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art.

Figure 1:
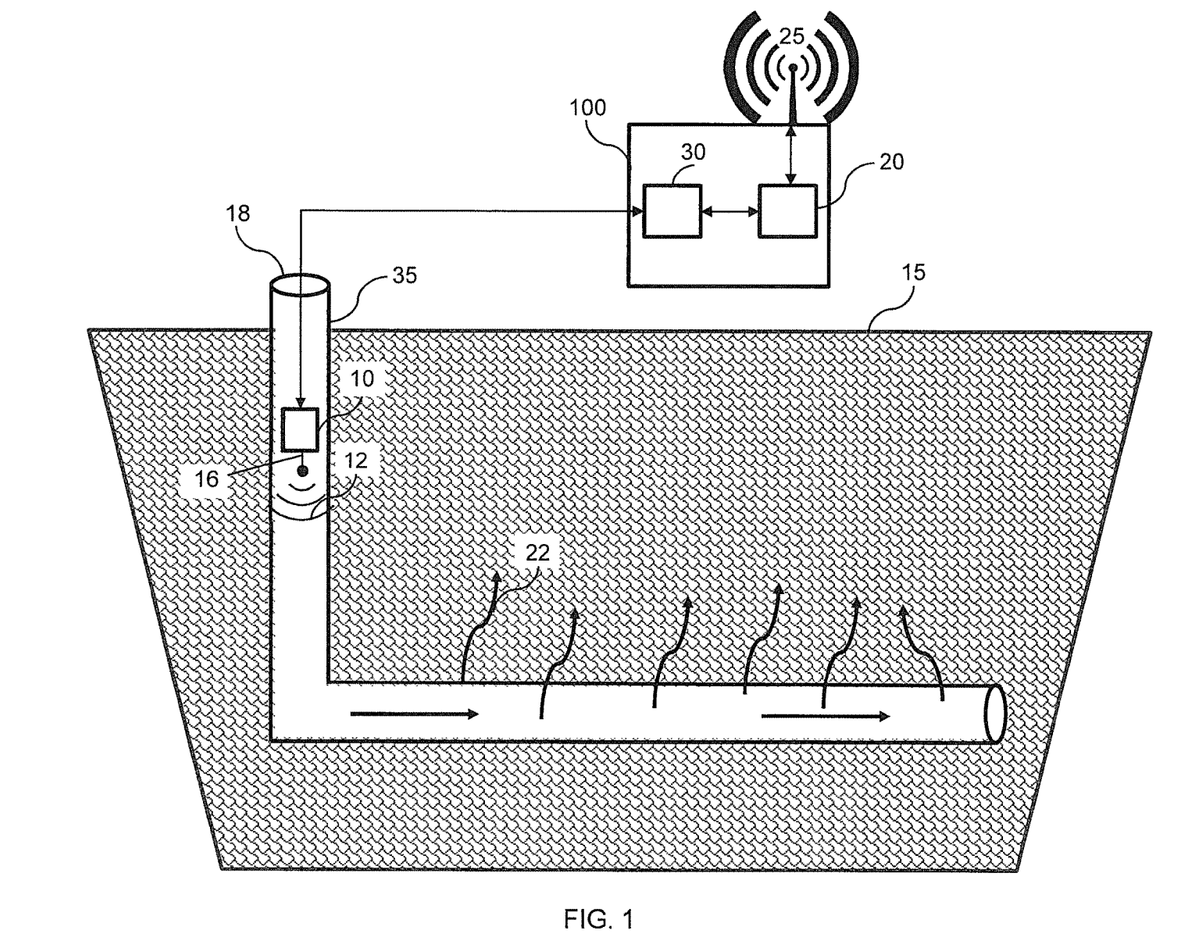
FIG. 1 is a schematic of a radar system for detecting a buried non-conductive pipe, according to one or more embodiments of the invention.

Turning now to the figures, FIG. 1 is a schematic of a radar system 100 for detecting a buried non-conductive pipe 35, according to one or more embodiments of the invention. The system 100 includes a radio frequency (RF) transmitter 10 that may be configured to transmit guided RF energy 12 through one end 18 of the non-conductive pipe 35. The non-conductive pipe can be made of any polymeric material, including but not limited to polyethylene (PE). This figure shows the pipe 35 is buried in the earth 15 as a leaky shield similar to that of a "leaky feed." A leaky feed can be thought of as a poorly made coax cable with shielding braid that does not maintain integrity for the signal it is transporting, in that some of the energy radiates out of the braiding. Similar to a coax-based leaky feed, RF energy 12 can go down the pipe 35 and some energy 12 can leak at or more locations along the pipe 35, which is shown as arrows 22 pointing out of the pipe 35 to depict waves escaping the waveguide. This escaping energy 22 in some sense can look like what GPR approaches want. That is, they want to focus reflected energy from the center of the tube being detected. Unfortunately for GPR, much of the energy used in their approach does not hit the center of the tube, and that which does can reflect in a variety of directions based on the angle of incidence and the particular makeup of the ground. The approach in the present invention propagates energy 12 initially down the tube-based waveguide knowing that some will leak. Energy 22 that leaks has the potential of being detected from outside the tube 35, for example, from above ground. Further, unlike GPR, it is known that the leaked energy 22 started inside the waveguide. Thus, directional detection of the leaked energy 22 can be used to create a set of crossing vectors that further pinpoint the tube 35.

Transmitter 10 may include a simple ON/OFF keying modulator (not shown) with a carrier frequency of approximately 40 MHz or more. 40 MHz was chosen since it is known to have the possibility of penetrating dirt at reasonable power levels. The transmitter 10 was utilized at various power levels, but good results were seen even at levels that were below 1 Watt. The transmitter 10 may also include a simple directional antenna that could be used to start the waves 12 emanated from the transmitter 10 down the path of the waveguide, i.e. the tube 35 to be mapped. The modulated signal can be coded such that it can be detected with a simple AM receiver. That is, an envelope on the order of 1000 Hz can be sent at about 40 MHz or more. Additionally, the envelope can be toggled ON and OFF at a rate of about three times per second or more. Thus, the transmitted signal 12 could basically be detected by utilizing an AM receiver tuned to 40 MHz and simply listening for a 1000 Hz beeping tone. It should be noted, however, that the transmitter 10 may be within the pipe or outside the pipe 35, or within close proximity to the pipe 35.

System 100 may further include a RF receiver 20 that may be configured to receive electromagnetic signals due to RF energy 22 leaks in one or more locations along the non-conductive pipe 35. The receiver 20 can be a software defined radio that may be encased in a brushed aluminum enclosure. The receiver 20 may include ultra-low phase noise 0.5 PPM TCXO, RF-suitable voltage regulator, a custom heat sink, silicone pads, and SMA female connector. Receiver 20 may be a USB-compliant device, including tightly-spaced embedded devices like the Raspberry Pi SDR frequency capability of approximately 25 MHz-1700 MHz. This frequency range can optionally be extended down to 100 kHz or lower with an external device if necessary.

Receiver 20 may include an antenna 25 that may be configured to receive and read signals 22. The antenna 25 may be operated by a wireless remote controller for the rotor, and can be configured to receive VHF/UHF/AM/FM signals in the range of 120 miles or more. The antenna 25 may have a built-in 360 degree motor rotor, dual TV outputs, and built-in super low noise amplifiers. In one example embodiment, receiver 20 includes an AM receiver. It should be noted here that although example embodiments of the receiver and antenna are disclosed, it may be apparent to one of skill in the art that dipole antennas and/or mono-pole antennas may be used for the purpose of receiving the signals.

System 100 may further include one or more processors 30 that may be operatively connected to the transmitter 10 and receiver 20 and configured to process the received signals 22 to determine a location of the non-conductive pipe 35. The one or more processors 30 may be further configured to determine a distance travelled by the RF energy 12 by determining a difference in time from when the energy is detected by the RF receiver 20 versus when the energy was transmitted from the RF transmitter 10. The receiver 20 may be further configured to detect a direction of the leaked RF energy 22, and the one or more processors 30 may be configured to create a set of crossing vectors to precisely locate the leak on the non-conductive pipe 35. The one or more processors 30 may be further configured to filter the received signals 22 using a band-pass filter, and generate a spectrogram of the band-pass filtered signals. The processing step may further include processing the received signals using interferometry to detect phase changes. Although a processor 30 is illustrated in FIG. 1, one or more microcontrollers (instead of processors) may be used to process the signals 22 received by the receiver 20.

It should be noted here that although example embodiments of the transmitter and antenna are disclosed, it may be apparent to one of skill in the art that dipole antennas and/or mono-pole antennas may be used for the purpose of transmitting the signals.

Figure 2:
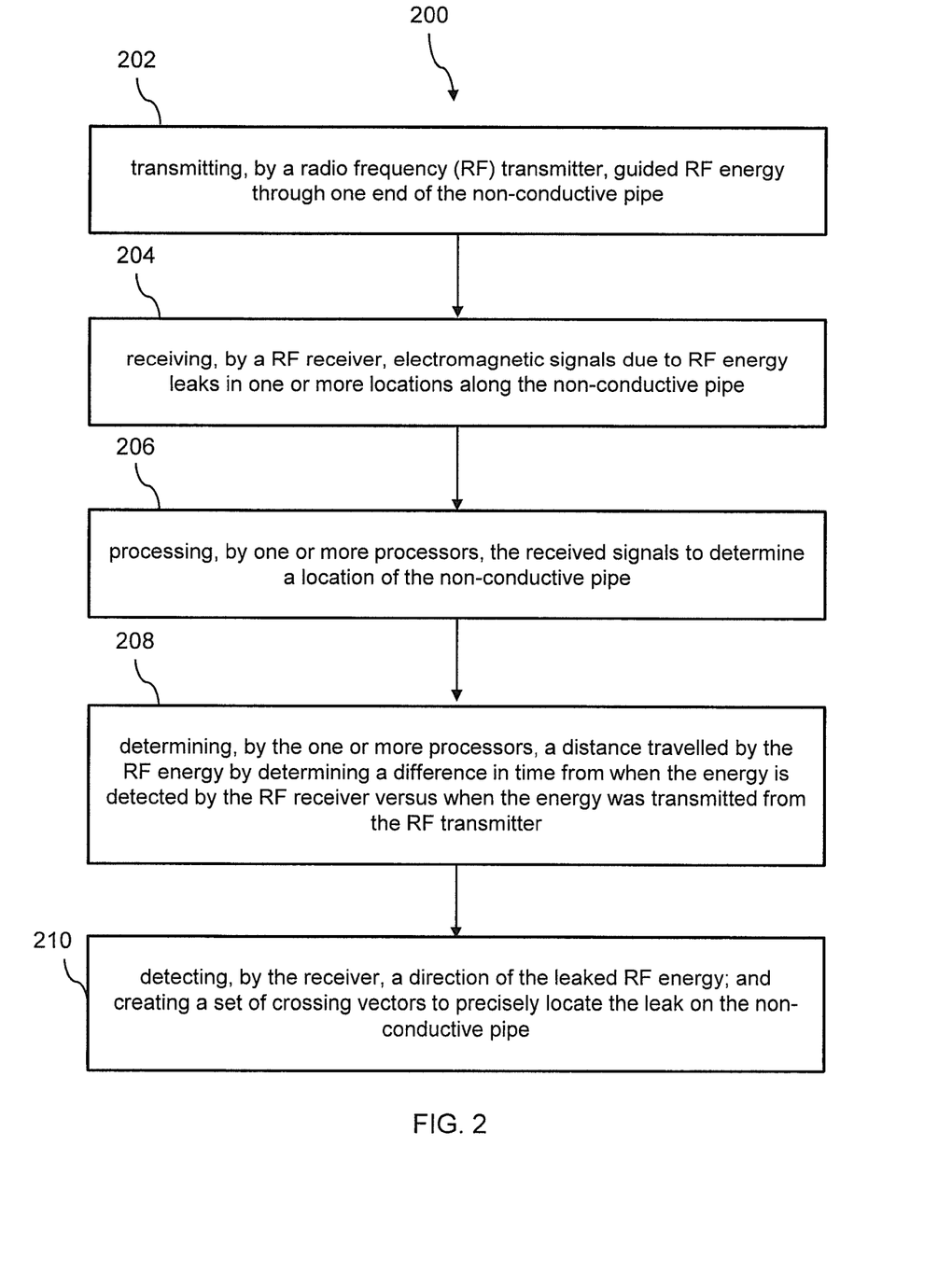
FIG. 2 is an example method for detecting a buried non-conductive pipe, according to one or more embodiments of the invention.

FIG. 2 is an example method 200 for detecting a buried non-conductive pipe, according to one or more embodiments of the invention. The method 200 includes at step 202 transmitting, by a radio frequency (RF) transmitter, guided RF energy through one end of the non-conductive pipe. At step 204, the method includes receiving, by a RF receiver, electromagnetic signals due to RF energy leaks in one or more locations along the non-conductive pipe. At step 206 the method includes processing, by one or more processors, the received signals to determine a location of the non-conductive pipe. The method may also include step 208 of determining, by the one or more processors, a distance travelled by the RF energy by determining a difference in time from when the energy is detected by the RF receiver versus when the energy was transmitted from the RF transmitter. The method may further include step 210 of detecting, by the receiver, a direction of the leaked RF energy, and creating a set of crossing vectors to precisely locate the leak on the non-conductive pipe. The method may further include filtering, by the one or more processors, the received signals using a band-pass filter, and generating, by the one or more processors, a spectrogram of the band-pass filtered signals. The processing step may further include processing the received signals using interferometry to detect phase changes.

Figure 3:
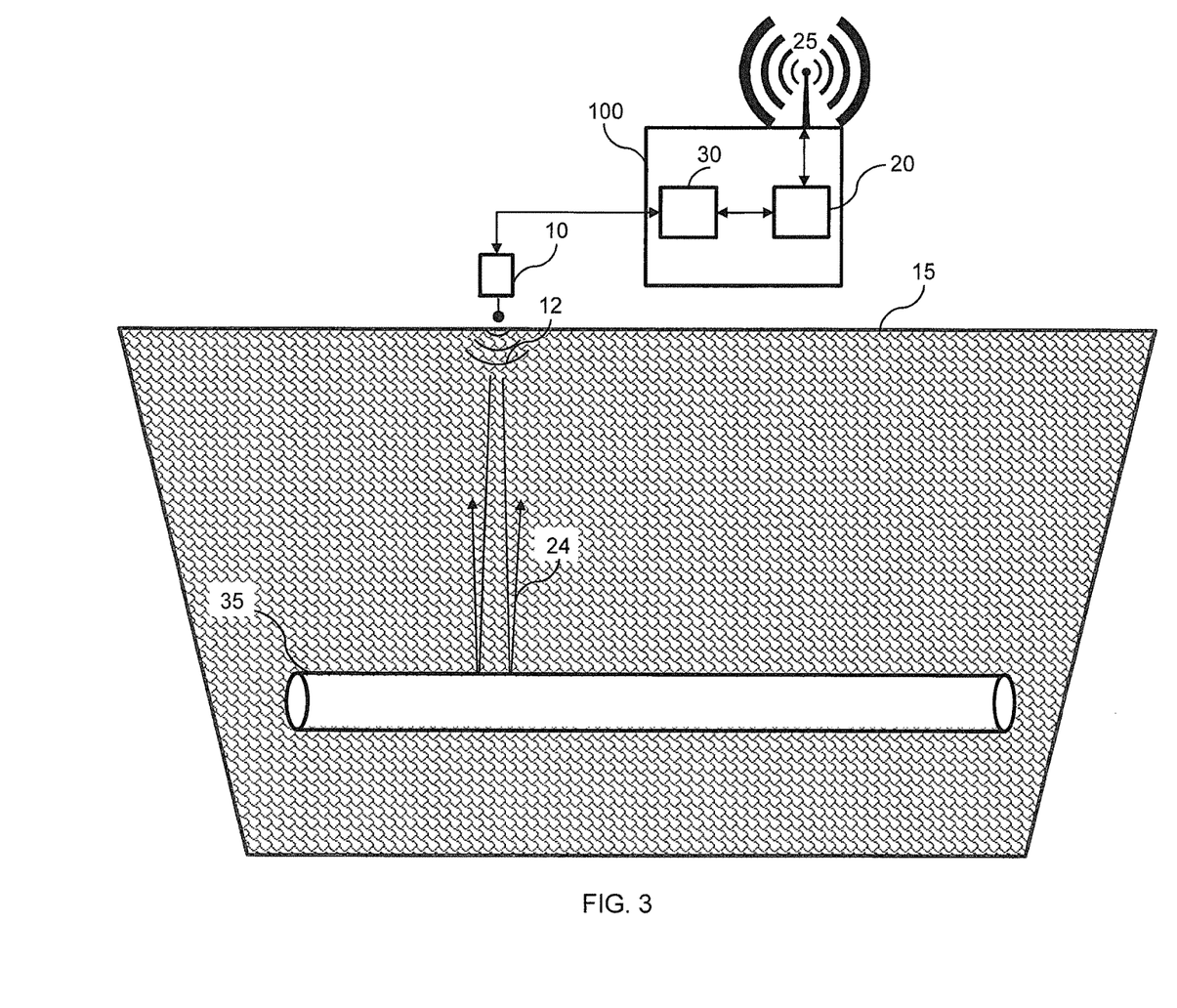
FIG. 3 illustrates another example method for detecting a buried non-conductive pipe using the radar system, according to one or more embodiments of the invention.

FIG. 3 illustrates another method for detecting a buried non-conductive pipe using the radar system 100, according to one or more embodiments of the invention. This method includes transmitting, by the radio transmitter 10, guided radio frequency (RF) energy 12 at a predetermined location on the ground 15, and receiving, by the RF receiver 20, electromagnetic signals 24 due to reflection of radio signals at one or more locations along the non-conductive pipe 35. The transmitter may be within the pipe or outside the pipe, as illustrated in FIG. 3. The method may also include processing, by one or more processors 30, the received signals 24 to determine a location of the non-conductive pipe 35. The processing step may include steps discussed with respect to FIGS. 1 and 2. For example, the method may also include determining, by the one or more processors, a distance travelled by the RF energy by determining a difference in time from when the energy is detected by the RF receiver versus when the energy was transmitted from the RF transmitter. The method may further include the step of detecting, by the receiver, a direction of the leaked RF energy, and creating a set of crossing vectors to precisely locate the leak on the non-conductive pipe. The method may further include filtering, by the one or more processors, the received signals using a band-pass filter, and generating, by the one or more processors, a spectrogram of the band-pass filtered signals. The processing step may further include processing the received signals using interferometry to detect phase changes.

Although example embodiment of the transmitter 10 are disclosed, the transmitter 10 may be on the surface of the ground, as illustrated in FIG. 3, above the ground, or below the ground, as illustrated in FIG. 2, for example.

Figure 4:
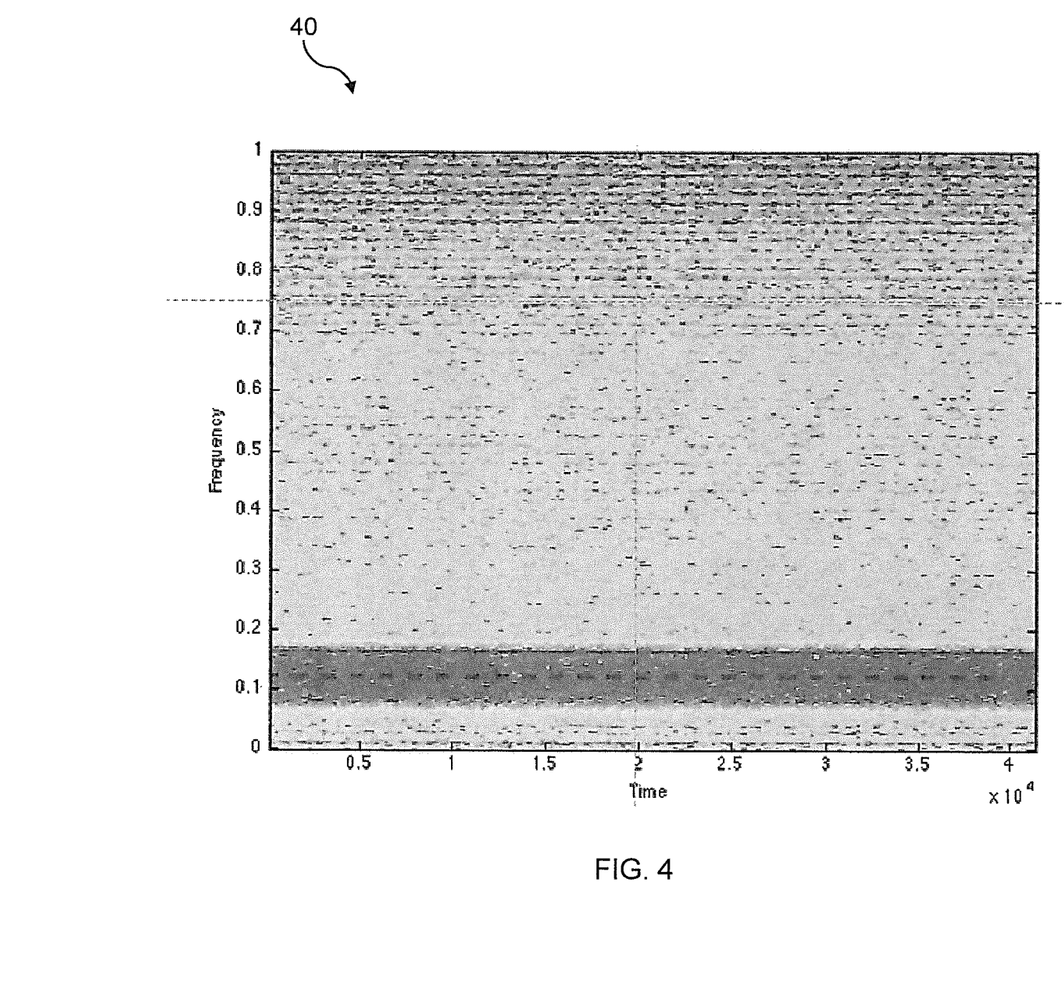
FIG. 4 is an example spectrogram of band-pass filtered signals received by the receiver of the system, according to one or more embodiments of the invention.

FIG. 4 is an example spectrogram 40 of band-pass filtered signals received by the receiver of the system, according to one or more embodiments of the invention. It can be noticed from this graph that one can also detect beeps at the metal risers that may be connected to plastic tubes. These may be classic risers that typically have a gas meter mounted to them. Thus, by detecting the time difference between when the energy is detected coming out of a riser versus when it was transmitted or when it was detected at a particular portion of the buried pipe, the time of flight can be measured for the energy traveling within the waveguide (the non-leaked) energy. This time of flight can give the distance the wave traveled, for example, and so this method can be used to measure the distance traveled in the tube as well.

Expanding upon the energy traveling within the waveguide, one can also see when it reflects and comes back based on the associated reflection coefficient imposed by various branches and dead ends of the pipe. Utilizing the receiver to collect data for this form of phenomena was accomplished by burying a receiver antenna near the tube and then processing frequency down-converted digital samples of the RF energy impinging on the receiver antenna with particular interest in detecting the reflections. That is, processing the data in a fashion as is done in a classic Time Domain Reflectometer (TDR) approach. A TDR measures reflections along a conductor. In order to measure those reflections, the TDR will transmit an incident signal onto the conductor and listen for its reflections. If the conductor is of a uniform impedance and is properly terminated, there will be no reflections and the remaining incident signal will be absorbed at the far-end by the termination. However, if there are impedance variations, some of the incident signal will be reflected back to the source. A TDR is similar in principle to radar.

Figure 5:
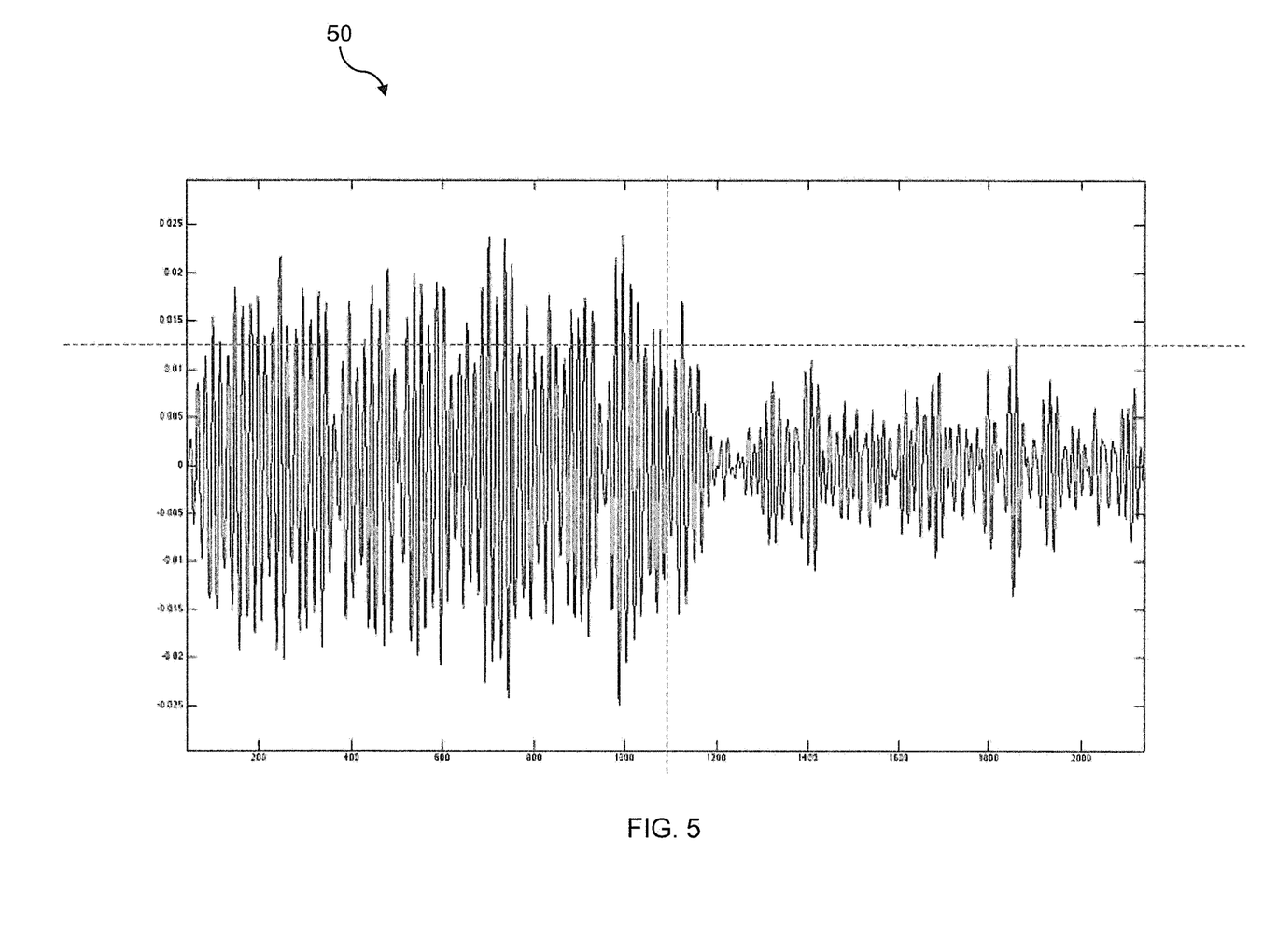
FIG. 5 is an example time-domain graph of band-pass filtered signals received by the receiver of the system, according to one or more embodiments of the invention.

FIG. 5 is an example time-domain graph 50 of band-pass filtered signals received by the receiver of the system 100, according to one or more embodiments of the invention. With this setup, one is able to walk along the buried pipe and, when pointing at it with the directional receiving antenna, one can hear beeps. FIG. 4 shows the corresponding frequency spectrum when the beeps are being detected. Results of a histogram of the reflection adjacency is shown in FIG. 4, for example. This shows that the present methods can be utilized to further aid in mapping the buried conduit. The combined approaches are independent and can therefore support each other in helping remove ambiguity (particularly those found with reflectometry approaches) and increase accuracy and help working past possible blind spots that can occur (e.g. when the plastic pipe travels under a larger metal object).

Example Definitions for Terms Used in the Disclosure

A radar (radio detection and ranging) system emits a known radar signal into a medium (typically air) in order to determine the distance to objects of interest. Reflections of the radar signal occur when medium through which the radar signal is propagating changes (e.g. from air to a solid object). When a radar signal encounters a medium change, some of the energy in the radar signal is typically reflected back toward the originating source. The time of flight as well as the direction of the transmitted and reflected energy can be utilized to determine the position of objects causing the reflections. Radar imaging combines radar returns focused in spatially unique directions in order to create an image based on the reflections. This image can be referred to as a map.

When radar signals encounter a medium change, not all of the energy is reflected. Some energy is absorbed, some reflects, and some continues to propagate in the original direction. The energy that continues to propagate in the original direction may in turn be reflected by yet another medium change and, thus, it is possible with radar to "see through" or image through objects.

A Time Domain Reflectometer (TDR) measures reflections along a conductor. In order to measure those reflections, the TDR will transmit an incident signal onto the conductor and listen for its reflections. If the conductor is of a uniform impedance and is properly terminated, there will be no reflections and the remaining incident signal will be absorbed at the far-end by the termination. However, if there are impedance variations, some of the incident signal will be reflected back to the source. A TDR is similar in principle to radar.

The reflection coefficient (the amount of energy that is reflected by a discontinuity in the transmission medium) is the ratio of energy that returns relative to the incident energy. This is often called the impedance change or impedance mismatch.

Impedance mismatches are defined as metal-to-metal contacts on a metallic conductor that have an impedance value that is different from the metallic conductor. When a radar signal that is tuned to the conductor impedance is applied to the contact, a portion of that energy will be reflected back to the source of the signal. In power engineering, measurement of unexpected impedance values is a classic way to determine faults in a metallic conductor. When impedance measurements return unexpected values that indicate the possibility of a problem, we call them impedance faults.

A leaky feed can be thought of as a poorly made coax cable with shielding braid that does not maintain integrity for the signal it is transporting in that some of the energy radiates out the braiding.

A waveguide is a particular structure that attempts to direct radio waves down a particular path. Classic waveguides are made of metal and are often used for radio waves in the microwave.

The Specification, which includes the Summary, Brief Description of the Drawings and the Detailed Description, and the appended Claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. The verb "operatively connecting" and its conjugated forms means to complete any type of required junction, including electrical, mechanical or fluid, to form a connection between two or more previously non-joined objects. If a first component is operatively connected to a second component, the connection can occur either directly or through a common connector. "Optionally" and its various forms means that the subsequently described event or circumstance may or may not occur. The description includes instances where the event or circumstance occurs and instances where it does not occur.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The systems and methods described herein, therefore, are well adapted to carry out the objects and attain the ends and advantages mentioned, as well as others inherent therein. While example embodiments of the system and method has been given for purposes of disclosure, numerous changes exist in the details of procedures for accomplishing the desired results. These and other similar modifications may readily suggest themselves to those skilled in the art, and are intended to be encompassed within the spirit of the system and method disclosed herein and the scope of the appended claims.

The invention claimed is:

1. A method for detecting a buried non-conductive pipe, the method comprising:
   transmitting, by a radio frequency (RF) transmitter, guided RF energy through one end of the non-conductive pipe;
   receiving, by an RF receiver, electromagnetic signals due to RF energy leaks in one or more locations along the non-conductive pipe; and
   processing, by one or more processors, the received signals to determine a location of the non-conductive pipe.

2. The method of claim 1, further comprising:
   determining, by the one or more processors, a distance travelled by the RF energy by determining a difference in time from when the energy is detected by the RF receiver versus when the energy was transmitted from the RF transmitter.

3. The method of claim 1, further comprising:
   detecting, by the receiver, a direction of the leaked RF energy; and
   creating a set of crossing vectors to precisely locate the leak on the non-conductive pipe.

4. The method of claim 1, further comprising:
   filtering, by the one or more processors, the received signals using a band-pass filter; and
   generating, by the one or more processors, a spectrogram of the band-pass filtered signals.

5. The method of claim 1, further comprising:
   modulating, by the transmitter, the RF signal to transmit 1000 Hz signals at a frequency of approximately 40 MHz or more.

6. The method of claim 1, wherein the processing step further comprises processing the received signals using interferometry to detect phase changes.

7. A system for detecting a buried non-conductive pipe, the system comprising:
   a radio frequency (RF) transmitter for transmitting guided RF energy through one end of the non-conductive pipe;
   an RF receiver for receiving electromagnetic signals due to RF energy leaks in one or more locations along the non-conductive pipe; and
   one or more processors for processing the received signals to determine a location of the non-conductive pipe.

8. The system of claim 7, wherein a carrier frequency of the RF transmitter is approximately 40 MHz or more.

9. The system of claim 7, wherein the RF receiver comprises an AM receiver and a directional antenna.

10. The system of claim 7, wherein the one or more processors for determining a distance travelled by the RF energy by determining a difference in time from when the energy is detected by the RF receiver versus when the energy was transmitted from the RF transmitter.

11. The system of claim 7, wherein the receiver is further for detecting a direction of the leaked RF energy, and the one or more processors for creating a set of crossing vectors to precisely locate the leak on the non-conductive pipe.

12. The system of claim 7, wherein the one or more processors are further for filtering the received signals using a band-pass filter; and for generating a spectrogram of the band-pass filtered signals.

13. The system of claim 7, further comprising:
   a modulator for modulating the RF signal to transmit 1000 Hz signals at a frequency of approximately 40 MHz or more.

14. The system of claim 7, wherein the one or more processors are further for processing the received signals using interferometry to detect phase changes.

* * * * *